A. B. J. SAUERBRUNN.
NOISELESS ANTISIPHON SELF CLEANING TRAP.
APPLICATION FILED JAN. 21, 1919.
1,323,324.
Patented Dec. 2, 1919.
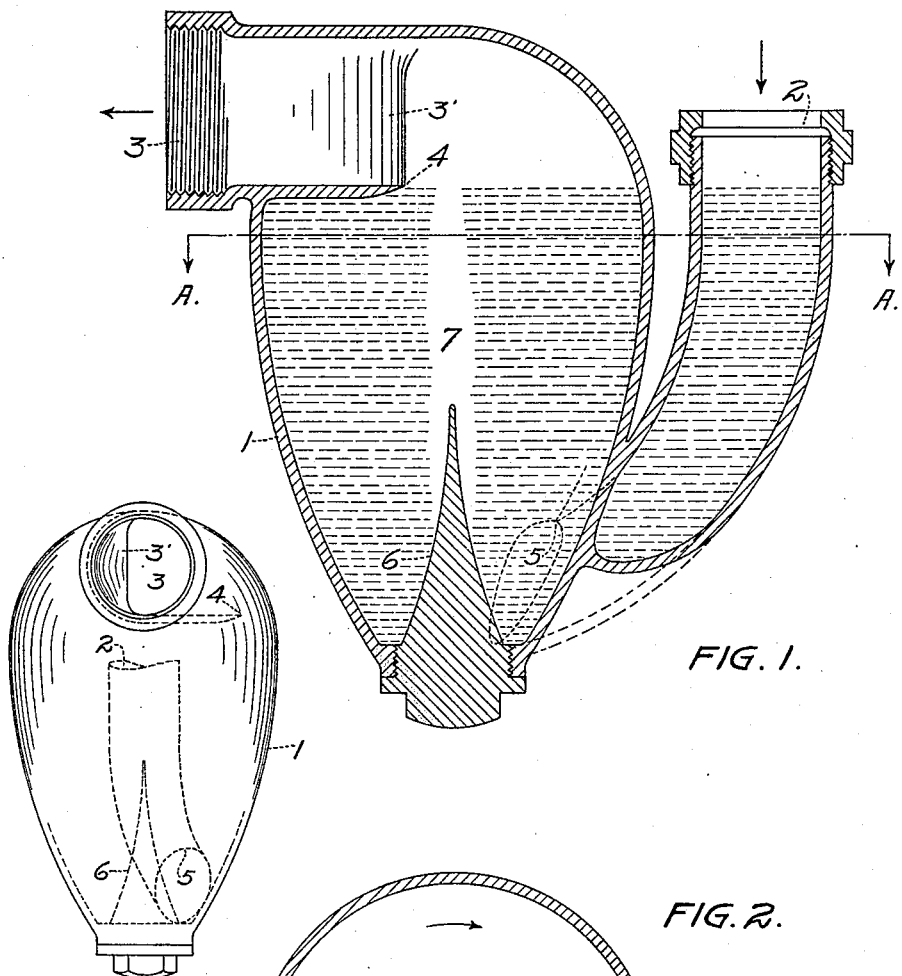
FIG. 1.
FIG. 2.
FIG. 3.
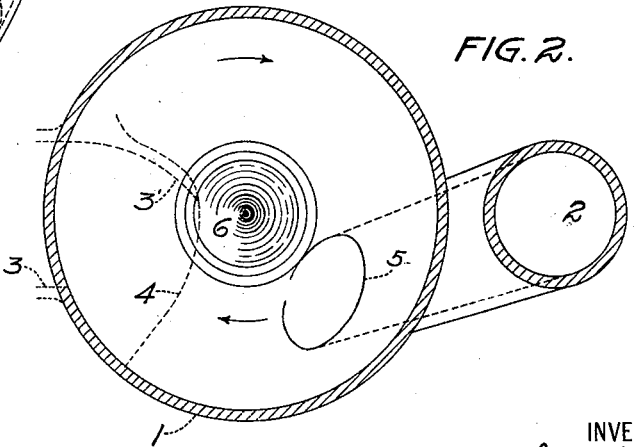
WITNESSES:
Frank Voelker.
Ralph R. Bell
INVENTOR
Arthur B. J. Sauerbrunn

UNITED STATES PATENT OFFICE.

ARTHUR B. J. SAUERBRUNN, OF BROOKLYN, NEW YORK.

NOISELESS ANTISIPHON SELF-CLEANING TRAP.

1,323,324.  Specification of Letters Patent.  Patented Dec. 2, 1919.

Application filed January 21, 1919. Serial No. 272,236.

*To all whom it may concern:*

Be it known that I, ARTHUR B. J. SAUERBRUNN, a citizen of the United States, and a resident of New York city, borough of Brooklyn, in the county of Kings and State of New York, have invented certain new and useful Improvements in Noiseless Antisiphon Self-Cleaning Traps, of which the following is a specification.

This invention relates to sewer gas traps for use on the discharge pipe of plumbing fixtures, other than water closets, and is designed to produce a trap which will reestablish a water seal after any suction or siphonic action caused by the flow of water through the connecting discharge pipe from a higher elevation. In plumbing installations where the fixtures are located on different floors and having the waste pipes connecting with one discharge pipe leading to the sewer there is a tendency for the flow of water from upper floor fixtures to produce a suction in the lower floor branches. This suction is at times strong enough to break the water seals of traps on the lower floors, *i. e.* that air is pulled through the traps and in the type of traps usually used the air drives before it enough of the water standing in the traps to prevent reëstablishing the seals after the suction ceases. This renders the entire plumbing system unsanitary and obnoxious to the regulations of the building and health departments of modern city governments. Heretofore in traps designed to be antisiphonic, including direct and rotary flow types, a partition, dam, spillway, cut-off lip or baffle plate within the trap body, near the outlet leg, so obstructed the natural flow of water as to cause a turbulent mixing and tumbling of the water against the natural flow thereby seriously mixing with and retarding the air suction current and destroying its antisiphonic usefulness besides causing a noisy bubbling sound as the air passes from the inlet to the outlet when the trap is siphoning. Other rotary flow types, depending upon centrifugal force to throw the water and waste matter to the outlet, commingle the water and air thereby destroying the free air passage and are still further not of antisiphonic nature in that no structural means is provided at the outlet to control the water in the trap body, when the trap is siphoning. A properly designed trap must also be free from various other objections in order to pass inspection and I have invented a trap to meet these requirements which is antisiphonic, in that the seal cannot be destroyed by siphonic or air suction action, which is self cleaning and noiseless in action, and which has no interior partitions extending above the level of the water left by a normal suction-produced flow of air through it.

One of the chief objects of my invention is to provide means, within a trap or rotary design for diverting the natural flow of water to waste from the trap body without causing a turbulence within the body and at the same time maintain undisturbed a free passage for the air suction current which is absolutely essential in an efficient antisiphon trap.

The preferred form of trap embodying my invention is illustrated in the accompanying drawing, in which:—

Figure 1 is a sectional side elevation exposing its interior construction. Fig. 2 is a sectional plan view on the line A. A., Fig. 1. Fig. 3 is a rear view looking into the outlet mouth and showing the inlet leg and interior construction in dotted lines.

Similar reference characters refer to like parts throughout the several views.

Referring to the drawing, the numeral 1 indicates the main body of the trap which is shaped like a top, *i. e.* narrow at the bottom and curving outwardly to the widest part near the top and the top forming a hemisphere and with any horizontal cross section of the body forming a circle. The inlet leg or branch 2 being disposed in a substantially vertical position is wholly exterior to the body 1 and joins the same tangentially, for a purpose as hereinafter described, at one side of the trap near the bottom and its highest exterior point of juncture or connection with the body of the trap is below the level of the water left in the trap after a normal suction produced flow of air has passed through it. Preferably the inlet leg 2 is tapered toward the juncture with the trap body and forms a sharp, sealing, cut-off edge 5. The cone 6 is integral with the cleanout plug and extends into the trap interior from the bottom for the purpose of aiding the formation of the air suction center 7. The outlet leg or overflow branch 3 has its top at the same level and merges with the top of the trap body and is provided with a curved deflector 3' extending into the body of the trap to a point near the center on one side near the dividing line of the trap from front to back and within the outer limits of the air suction center 7 so that a suction of air up through the center 7 of the body may readily enter the outlet leg. It will be observed that a straight line dividing the trap from front to back or from inlet to outlet runs through the centers of the inlet and outlet connections and the center of the trap body. The horizontal cut off ledge 4 extends from the side of the trap body level with the bottom of the outlet leg and merges with the curved deflector 3′, as shown in Fig. 1, the construction being for purposes as hereinafter described.

Such being the construction, the operation of the trap is as follows: When there is a flushing of the trap, i. e. a flow of water produced by gravity through the trap, as when the plumbing fixture to the waste pipe of which it is connected is emptied, the natural tendency of water flowing down a pipe, to eddy and rotate from left to right clockwise, is continued by the tangentially connected inlet leg into the trap body interior where the water is caused to rotate and rise within the body by the circular and outwardly extending wall thereof, this action being aided by the cone projection 6, which assists in quickly forming and maintaining the usual passage or vent through which the air entering the water is drawn by suction. The centrifugal and upward motion, as shown by the arrow in Fig. 2, continues to the top of the trap body where the water is divided, by the cut-off ledge 4, without obstruction or interference; the portion above the cut off ledge 4 being completely diverted by the deflector 3′ from its rotary motion in the trap body without destroying the air suction center 7, and discharging the water in a spiral motion through the outlet leg 3. The portion below the cut off ledge 4 continues undisturbed its rotary motion maintaining the suction center 7. This natural sweep of the current is without obstruction in the trap construction or interference with turbulence of the water from the inlet to the outlet leg and carries with it all impurities automatically cleansing and scouring the trap. When the flow ceases the water stands in the position shown in Fig. 1, forming a gas tight seal. When there is a flow of water down the main waste pipe (not shown) extending to an upper floor or floors, a suction is produced in the outlet leg 3 which draws a portion of this water out through the outlet 3, caused by the water flowing under atmospheric pressure from the inlet leg 2 and creating within the trap body interior a vortex with its spiral suction center, as indicated at 7 Fig. 1, and when the level in the inlet leg 2 falls to the level of the cut-off edge 5, air is also sucked through. This air, however, being much lighter, has less momentum, and, as it passes under the cut-off edge, it is drawn into the spiral suction center 7 where it finds a free and consequently noiseless passage to the outlet leg 3. The water driven before the air, being much heavier, has more momentum and continues unobstructed its revolving motion under the cut-off ledge 4 without being drawn out of the trap body and maintains the air suction center 7. When the suction and flow of air cease there is still enough water left in the trap, after any normal flow of air therethrough, to drop back into the bottom of the trap and flow up into the inlet leg 2 far enough to bring the water level considerably above the highest exterior point of juncture of trap body and inlet leg, although not to as high a level as shown in Fig. 1. This feature of operation of the trap is due to its top shaped construction utilizing the natural tendency to spiral motion of water flowing down a pipe, enhancing the rotary motion in the trap body interior and cutting off without causing turbulence of the water the upper portion of the current and diverting it through the outlet, still retaining the spiral motion, and leaving undisturbed within the trap body the air suction center. Consequently the passing current of air traveling directly from inlet to outlet is without interference and noiseless and does not disturb any of the water in its travel, therefore leaving, after siphoning, practically all of the water in the trap body below the cut off ledge 4 to fall from the upper and larger capacity to the lower and lesser capacity of the trap to restore the normal water level, at a point above the highest exterior point of juncture between the trap body and inlet leg, that point of juncture being preferably placed much lower than the outlet orifice and nearer to the inlet than to the outlet. As a result a perfect gas seal is reëstablished and the level of the water seal being above the interior cut-off edge 5, and the upper portion of the water resting at every point against walls which are exposed to the outer air, any leakage through said walls which might be due to corrosion of the material, or imperfections in casting, becomes immediately apparent, and leads to repair or replacement of an imperfect trap.

In other forms of trap where such seal is formed wholly by an interior partition, any such perforation above the water level in such interior partition would not be apparent on external inspection and sewer gas could leak through above the water, the seal thereby being destroyed. This feature of construction and operation above described is one absolutely required by most sanitary building laws, i. e. the seal must be formed by exteriorly exposed trap walls, or, to put it in other language, there must be air space entirely around both portions of the trap containing the water seal and above their highest point of exterior connection so that any opening through which gas or water might pass may be discovered on inspection when the trap is in operation.

Another practical advantage of my invention is that the trap is of a shape such that it can be easily cast in one piece, the cores being easily removed, and the mold easily divided.

There are no pockets or corners in the trap interior in which solid matter can accumulate. Practically all dirt is swept out on each flushing of the trap, and any particularly heavy material which can not be so flushed out will deposit at the bottom of the trap where it will drop out on removing the plug and cone 6.

As above explained, an ample seal is secured at all times against any backward flow of sewer gas, and without the use of any heavy liquid such as mercury, which would form an obstruction to the normal flow of water in flushing operations besides being costly and unhealthy.

Having now described my invention, what I claim as new and desire to secure by Letters Patent, is:

1. In an automatic antisiphon self-cleaning trap, the combination with a trap body having a chamber top shaped with the large diameter at the upper part, of a tubular inlet leg opening tangentially into and near the bottom of the body chamber, and a horizontally extending tubular outlet leg opening from the body chamber near the top and having a horizontal ledge extending within the chamber of the body level with the bottom of the tubular passage of the outlet leg and also provided with a vertical curved deflector merging at its bottom with the horizontal ledge for deflecting all water rising above the ledge and striking it under centrifugal action.

2. The invention according to claim 1, when further characterized by the body chamber being further provided with a cone shaped part extending centrally upward part way between its bottom and the horizontal ledge and of relatively large diameter at the bottom and tapering off to a very small diameter at the top to provide a gradual variation in the horizontal cross section of the body chamber taken from the bottom upward.

3. The invention according to claim 1, further characterized by the tubular inlet leg being made tapering and its smaller end opening tangentially into the body chamber.

4. The invention according to claim 1, further distinguished by having the horizontal ledge provided with a relatively sharp edge directed toward the centrifugally moving water rising to the outlet leg.

5. The invention according to claim 1, further distinguished by having both the edge of the horizontal ledge and vertical edge of the curved deflector wall each formed substantially knife edged.

6. In an automatic antisiphon self-cleaning trap, a trap body having an interior chamber whose largest horizontal cross section is near its top and being circular at all horizontal cross sections, said body provided with a downwardly extending tubular inlet leg having a gradual curve and opening in the chamber close to its bottom, said body also provided with a tubular outlet leg at the top above the largest diameter and having a horizontal flat ledge projecting within the body chamber almost to the middle thereof and level with the bottom of the tubular passage of the outlet leg, and a substantially vertical curved deflector having its lower part merging with a portion only of the edge of the horizontal ledge, the construction providing a tangential inlet at the bottom and smallest diameter of the trap, and a curved outlet at the top and largest diameter of the trap, the interior walls of the body chamber from the bottom to the outlet ledge being devoid of projecting surfaces.

7. The invention according to claim 6, further characterized by having the extreme bottom and smaller end of the body chamber provided with an upwardly extending cone of a diameter at the bottom approximating the diameter of the bottom of the chamber and rapidly tapering throughout its length to substantially a point, the upper end of the cone terminating at a level intermediate of the tangential inlet and the inwardly projecting ledge of the outlet.

Signed at New York city, in the county of New York and State of New York this 11th day of Jan. A. D. 1919.

ARTHUR B. J. SAUERBRUNN.

Witnesses:
FRANK VOELKER,
RALPH R. BELL.